(12) United States Patent
Nunnink et al.

(10) Patent No.: US 11,281,868 B2
(45) Date of Patent: Mar. 22, 2022

(54) MODULAR VISION SYSTEM AND METHODS

(71) Applicant: Cognex Corporation, Natick, MA (US)

(72) Inventors: Laurens Nunnink, Simpelveld (NL); Carl Gerst, III, Clifton Park, NY (US); Rene Delasauce, Aachen (DE)

(73) Assignee: COGNEX CORPORATION, Natick, MA (US)

( * ) Notice: Subject to any disclaimer, the term of this patent is extended or adjusted under 35 U.S.C. 154(b) by 0 days.

(21) Appl. No.: 16/814,378

(22) Filed: Mar. 10, 2020

(65) Prior Publication Data
US 2021/0286959 A1 Sep. 16, 2021

(51) Int. Cl.
*G06K 7/00* (2006.01)
*G06K 7/10* (2006.01)

(52) U.S. Cl.
CPC ....... *G06K 7/0017* (2013.01); *G06K 7/10762* (2013.01); *G06K 7/10831* (2013.01)

(58) Field of Classification Search
CPC ............ G06K 7/0017; G06K 7/10831; G06K 7/10762
See application file for complete search history.

(56) References Cited

U.S. PATENT DOCUMENTS

| | | | |
|---|---|---|---|
| 5,600,116 A * | 2/1997 | Seo | G06K 7/10851 235/454 |
| 7,219,843 B2 * | 5/2007 | Havens | G06K 7/10574 235/462.41 |
| 9,082,034 B2 | 7/2015 | Lei et al. | |
| 9,182,356 B2 * | 11/2015 | Nagoshi | G01N 21/8806 |
| 9,819,863 B2 | 11/2017 | Osborne et al. | |
| 9,979,933 B1 * | 5/2018 | Nunnink | H04N 5/2257 |
| 10,389,925 B2 | 8/2019 | Kim et al. | |
| 10,502,925 B2 * | 12/2019 | Mistkawi | G02B 7/10 |
| 10,817,687 B2 | 10/2020 | Tan et al. | |
| 2005/0103858 A1 | 5/2005 | Zhu et al. | |
| 2006/0043187 A1 | 3/2006 | He et al. | |
| 2010/0176319 A1 * | 7/2010 | Nunnink | G06K 7/10811 250/566 |
| 2013/0235261 A1 | 9/2013 | Berkner et al. | |
| 2014/0118516 A1 | 5/2014 | Suzuki et al. | |
| 2016/0188936 A1 | 6/2016 | Nunnink et al. | |

FOREIGN PATENT DOCUMENTS

EP 1492357 A2 12/2004

OTHER PUBLICATIONS

Cognex, Datasheet: DataMan 150/260 Series Barcode Readers, Copyright 2017 Cognex Corporation, 6 pages.
European Patent Office, Extended Search Report, Application No. 21161772.5, dated Jun. 30, 2021, 9 pages.

\* cited by examiner

*Primary Examiner* — Seung H Lee
(74) *Attorney, Agent, or Firm* — Quarles & Brady LLP (57) ABSTRACT

A modular sensor system for use with a faceplate mountable to a housing can include first and second optical modules. Each of the optical modules can be configured to be removably receivable within either of a first mounting aperture or a second mounting aperture of the faceplate, in either of a first orientation or a second orientation.

20 Claims, 9 Drawing Sheets

MODULAR VISION SYSTEM AND METHODS

STATEMENT REGARDING FEDERALLY SPONSORED RESEARCH OR DEVELOPMENT

Not applicable.

BACKGROUND

The present technology relates to vision systems, for example, bar code readers.

SUMMARY OF THE TECHNOLOGY

Generally, embodiments of the technology can provide interchangeable modules and associated mounting systems for machine vision systems. For example, each modules of a plurality of interchangeable modules can exhibit a similar mounting structures for attachment to an imaging device, but can support a different type or arrangement of optical device. Thus, when used in combination with a compatible support structure (e.g., a faceplate of an imaging device with complementary mounting apertures), some embodiments can allow quick and easy transitions between different optical devices for different types of operations.

Some embodiments can include a modular sensor system including a housing, a faceplate removably mountable to the housing, a first squared modular mounting body, and a second first squared modular mounting body. Each of the first and second mounting bodies can be separately removably securable within either of the first of second squared mounting apertures in either of a first orientation or a second orientation.

Some embodiments can include a modular sensor system including a faceplate having a first mounting aperture and a second mounting aperture, a first optical module that can include a first optical device secured to a first mounting body, and a second optical module that can include a second optical device secured to a second mounting body. The first mounting body can be selectively securable within either the first mounting aperture or the second mounting aperture, in a first plurality of rotationally distinct orientations, for operation of the first optical device. The second mounting body can be selectively securable within either the first mounting aperture or the second mounting aperture, in a second plurality of rotationally distinct orientations, for operation of the first optical device.

Some embodiments include a modular sensor system for a machine vision system that includes a faceplate with a first mounting aperture and a second mounting aperture. Each optical module of a plurality of optical modules can include a mounting body and at least one of an optical device or a lens mount. A first-side mounting portion and a second-side mounting portion of each of the mounting bodies can be configured to engage either of a first-side mounting portion or a second-side mounting portion of either of the first or second mounting apertures to secure the respective mounting body to the faceplate and against rotation relative to the respective first or second mounting aperture with the respective mounting body in any of a plurality of mounting orientations.

To the accomplishment of the foregoing and related ends, the technology, then, comprises the features hereinafter fully described. The following description and the annexed drawings set forth in detail certain illustrative aspects of the technology. However, these aspects are indicative of but a few of the various ways in which the principles of the technology can be employed. Other aspects, advantages and novel features of the technology will become apparent from the following detailed description of the technology when considered in conjunction with the drawings.

While the technology is susceptible to various modifications and alternative forms, specific embodiments thereof have been shown by way of example in the drawings and are herein described in detail. It should be understood, however, that the description herein of specific embodiments is not intended to limit the technology to the particular forms disclosed, but on the contrary, the intention is to cover all modifications, equivalents, and alternatives falling within the spirit and scope of the technology as defined by the appended claims.

DETAILED DESCRIPTION OF THE TECHNOLOGY

The various aspects of the subject technology are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

Unless otherwise specified or limited, the terms "connected," "mounted," and "coupled" and variations thereof are used broadly and encompass both direct and indirect mountings, connections, supports, and couplings. Further, "connected" and "coupled" are not restricted to physical or mechanical connections or couplings. As used herein, unless expressly stated otherwise, "connected" means that one element/feature is directly or indirectly connected to another element/feature, and not necessarily electrically or mechanically. Likewise, unless expressly stated otherwise, "coupled" means that one element/feature is directly or indirectly coupled to another element/feature, and not necessarily electrically or mechanically.

As used herein, unless otherwise defined or limited, directional terms are used for convenience of reference for discussion of particular figures or examples, not to indicate unchangeable absolute or relative orientations. For example, references to vertical or horizontal orientations may be used to discuss aspects of a particular example or figure, but do not necessarily require similar orientation or geometry in all installations or configurations.

Various embodiments of the disclosed modular vision system are described herein in connection with a machine vision system including an electronic machine vision device and associated processing devices. That is because the features and advantages of the disclosure are well suited for this purpose. Still, it should be appreciated that the various aspects of the disclosure can be applied in the context of other types of systems, including machine vision systems other than those specifically discussed herein (e.g., handheld or fixed-mount imaging systems) and any other system that may benefit from a modular configuration.

Machine vision systems generally include one or more imaging devices and one or more processing devices (e.g., machine vision "engines") that are configured to automatically analyze certain aspects of acquired images. As such, machine vision systems can be used in manufacturing, assembly, test, measurement, automation, and control applications, among others, as non-limiting examples.

Generally, different configurations of machine vision systems, such as with different orientations or types of imaging sensors, different imaging lenses, or other optical modules (e.g., aimers, distance finders, etc.) may be needed to optimally perform specific machine vision tasks. For example, as noted above, machine vision systems can be configured to capture images of an object, analyze the images to identify relevant characteristics, actions, and so on, and instruct various devices (e.g., manufacturing or sorting devices) based upon the image analysis. In this context, an optimal type or orientation of an imaging sensor or an optimal type of lens or other optical device may be directly linked to the relative orientation of an object to be captured, the particular type of object or environment (e.g., relative to lighting considerations) or other factors. Accordingly, it may be useful for operators to be able to easily swap particular imaging sensors, lenses, or other optical devices for use with a particular machine vision system.

Some conventional imaging systems can be configured for capturing a specific object or for performing predetermined processes under particular conditions, with optical devices that are fixed in limited, predetermined and sometimes non-changeable orientations. Correspondingly, some conventional machine vision systems may be generally equipped to receive and operate with only a single (and single type of) optical device at any given time. Further, while some conventional systems can allow switching of optical devices, such as via the interexchange of lenses with similar mounting configurations, these systems may not be particularly adaptable to accommodate wide varieties of operations and operating conditions.

Embodiments of the technology can address these or other issues, including by providing optical modules that are adapted for ready interchange for individual or collective use with a particular machine vision system. For example, in some embodiments of the technology, a plurality of optical modules can include similar mounting structures but different optical devices or other operative portions, allowing the optical modules to be readily exchanged for each other for use with a particular machine vision system. In some embodiments, a machine vision system can include a faceplate that is securable (e.g., removably securable) to a housing and capable of being reinstalled onto the housing in another, discrete orientation, as may allow optical modules secured to the faceplate to be similarly reoriented relative to other components of the system. In some embodiments, a faceplate can include one or more (e.g., multiple) mounting apertures within each of which any one of a set of interchangeable optical modules can be received. In some embodiments, an optical module can be configured to be removably received within a faceplate of a machine vision system for operation in more than one orientation. In some embodiments, such optical modules can be configured to receive different types of lenses (e.g., via different types of lens mounts), imaging sensors, or imaging accessories.

In some embodiments, an optical module and a corresponding mounting aperture can have generally complementary geometry that is configured to allow the optical module to be secured in a plurality of different rotational orientations. In some embodiments, such geometry may be configured in order to provide a discrete number of rotational orientations, to allow for easy alignment of an optical module with a particular orientation (e.g., relative to another machine vision component), or to provide other benefits. For example, some optical modules and mounting apertures can exhibit complementary squared mounting profiles, with respective sets of mounting portions (e.g. mounting faces or edges) that extend at right angles relative to each other.

As used herein, unless otherwise specified or limited, "squared" refers to a geometry that includes at least two segments that collectively form at least two sides of a square (i.e., equal-sided rectangular) profile. As such, for example, a squared optical module can include a set of at least two perpendicular mounting portions (e.g., linear mounting edges) that collectively define a part of a square. In some embodiments, this configuration for an optical module, in combination with a similar configuration for a mounting aperture, can usefully provide operators with a discrete set of rotationally distinct mounting orientations for the optical module, along with relatively secure mounting interfaces (e.g., between aligned sets of mounting portions (e.g., mounting edges) of the module and the aperture. Further, the different mounting orientations for this configuration and others (e.g., other polygonal mounting portions) can be easily visually or tactilely identifiable by operators, and can also appropriately align with typically desired changes in orientations for different machine vision applications.

Although squared arrangements may be particularly useful in some arrangements, including for the examples reasons outlined above, other configurations are also possible. For example, some modules or mounting apertures according to the disclosed technology may form non-squared parts of polygonal (e.g., hexagonal) profiles, or otherwise deviate in part or in whole from a squared profile.

Figure 1:
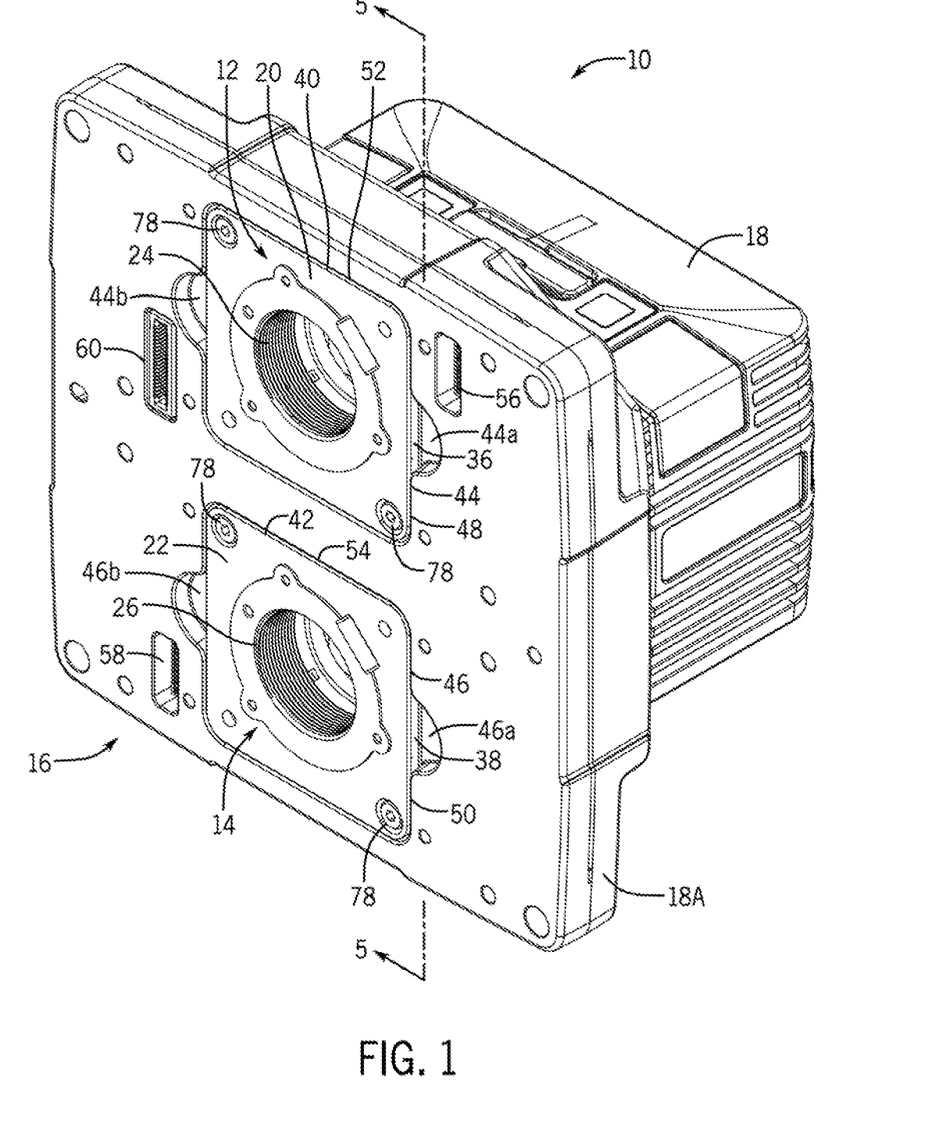
FIG. 1 is an isometric view of an machine vision system with a faceplate and a set of interchangeable optical modules in accordance with some embodiments of the technology.
Figure 2:
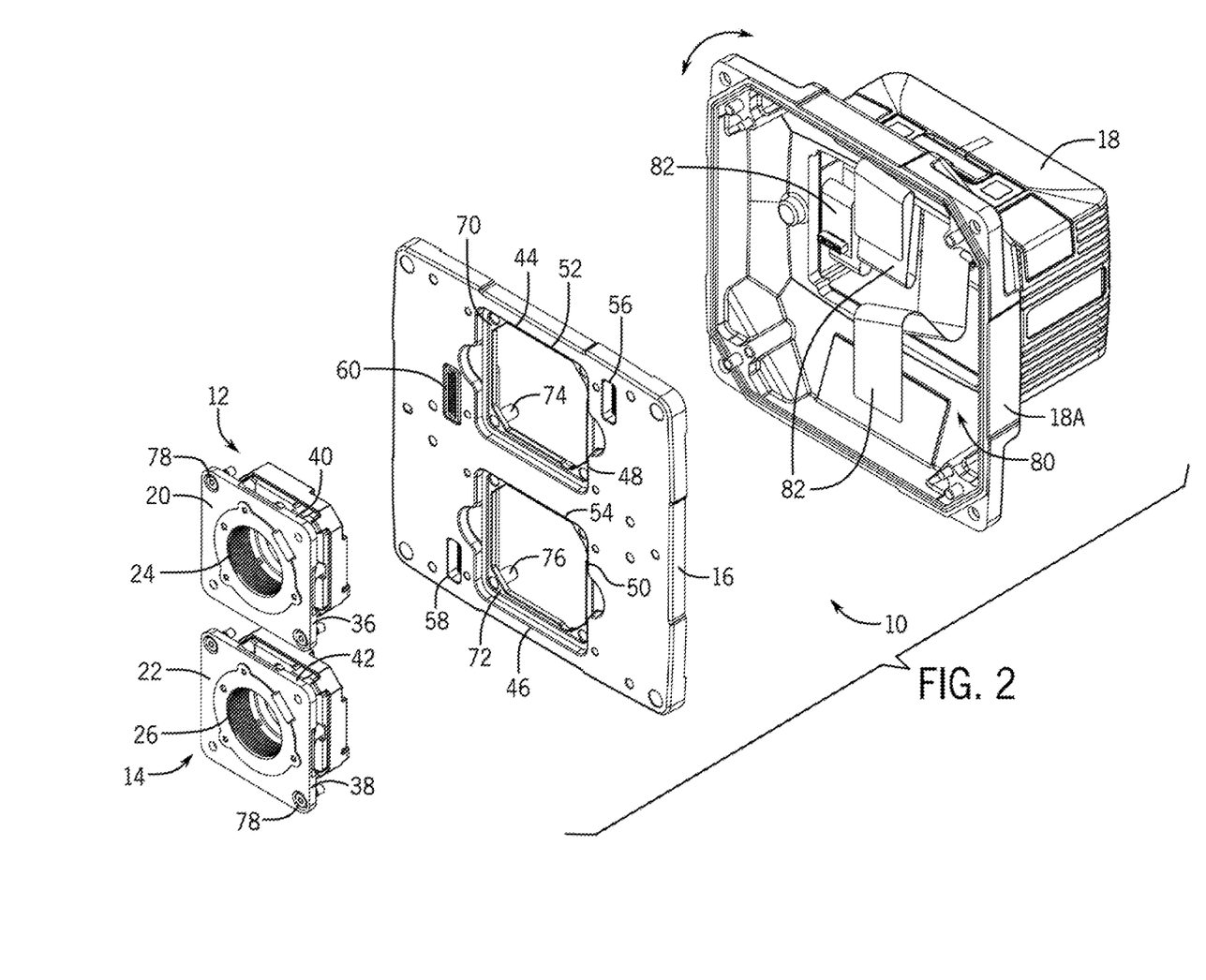
FIG. 2 is an isometric exploded top right front view of the machine vision system of FIG. 1.
Figure 3:
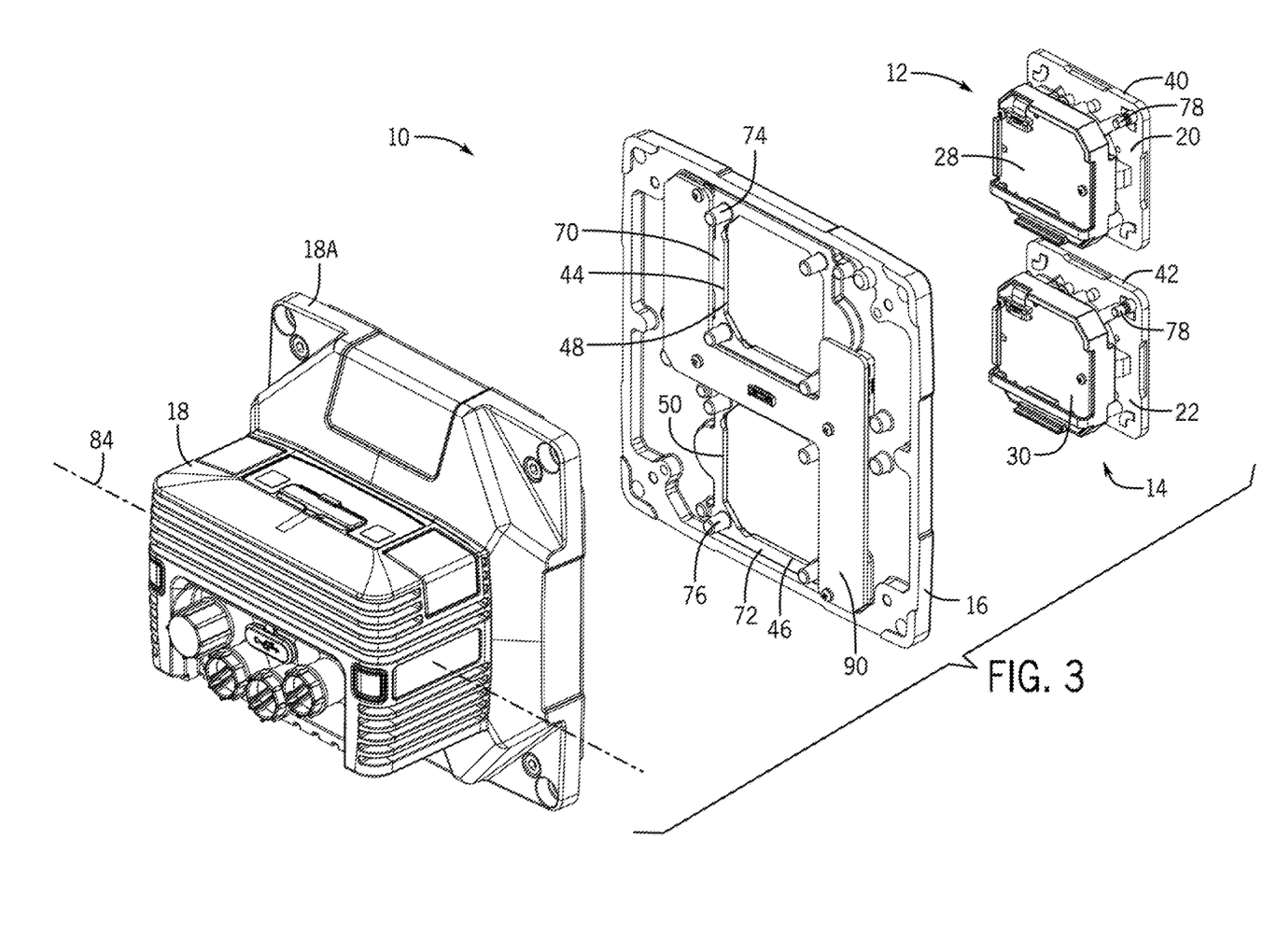
FIG. 3 is an isometric exploded top left rear view of the machine vision system of FIG. 1.

FIGS. 1-3 illustrate an example machine vision system 10 configured as an imaging device that is adapted to acquire and analyze one or more images of an object containing a machine readable symbol. The machine vision system 10 can use image acquisition software operable to perform any of various types of image acquisitions and analysis. For example, a conveyor transporting objects along a conveyor path causes relative movement between the objects and a field of view of the machine vision system 10. Accordingly, as the conveyor operates, the machine vision system 10 can capture successive images of the objects (or other subjects)

and then analyze (e.g., identify and decode) one or more symbols included in one or more of the images. In other embodiments, image acquisition for other objects or other machine-vision operations can also (or alternatively) be executed. Further, in some embodiments, the machine vision system 10 (or others according to this disclosure) can be used to image objects not on conveyors, can be operated as movable or handheld devices, and so on.

The machine vision system 10 includes a set of first and second optical modules 12, 14 removably and interchangeably received within a faceplate 16. In the illustrated embodiment, the faceplate 16 is removably attached to a housing 18, although other configurations are possible. For example, in some embodiments a housing bezel 18A of the housing 18 can be removed from the housing 18, rotated, and reattached to the housing 18 in a different orientation (see, e.g., rotation arrow in FIG. 2). In some embodiments, the interface between the housing 18 and the housing bezel 18A can be a square-shaped interface to allow rotation of the housing bezel 18 in approximately 90-degree increments relative to the housing 18.

The first and second optical modules 12, 14 are shown and described herein as a first optical module 12 and a second optical module 14. However, more or fewer modules can be provided. As further discussed below, the modular configuration of the optical modules 12, 14, in combination with corresponding construction of mounting apertures in the faceplate 16, can allow the machine vision system 10 to be easily customized to a wide variety of applications that may use a wide variety of optical devices alone or in various combinations.

In the illustrated embodiment, as shown in FIGS. 2 and 3 in particular, each of the first and second optical modules 12, 14 have a mounting body 20, 22, a lens mount 24, 26 (e.g., for s-mount or c-mount lens types), and an optical device. As one example, the optical devices shown and described for the first and second optical modules 12, 14 are configured as a first and second imaging sensors 32, 34 mounted to printed circuit boards (PCBs) 28, 30. However, other optical devices such as a distance sensor or measurement device (e.g., time-of-flight sensor, triangulation device, or other 3D sensor), an optical aiming device (e.g., for pattern projection), a lens assembly or a lens mount (e.g., for s-mount or c-mount lens types, etc.). In some embodiments, other devices can additionally (or alternatively) be included, such as an accelerometer or other orientation sensors.

In different embodiments, a mounting body of a module can exhibit a variety of different mounting portions (e.g., edges of mounting flanges) that facilitate attachment to a relevant machine vision (or other) system, including for attachment in multiple discrete orientations. For example, the mounting bodies 20, 22 are configured with squared mounting profiles, including squared first-side mounting portions 36, 38 and squared second-side mounting portions 40, 42 that extend at right angles relative to each other. In particular, mounting profiles of the mounting bodies 20, 22 (and the mounting bodies 20, 22 as a whole) are substantially square in shape, with the first-side mounting portions 36, 38 being linear and perpendicular to the second-side mounting portions 40, 42, which is also linear, and with additional mounting profiles symmetrically opposing each of the mounting portions 36, 38, 40, 42. (As used herein, "substantially square" indicates profiles that can include right-angle corners or rounded corners.) In other embodiments, however, other configurations are possible, such as configurations with two squared sides (e.g., similar to the mounting portions 36, 40) and two or more non-squared sides.

In the illustrated embodiment, the first-side mounting portions 36, 38 and the second-side mounting portions 40, 42 extend along the entirety of the respective side of the mounting bodies 20, 22. In other embodiments, a side mounting portion of a mounting profile may extend only partly along a relevant side of a module. Further, as also noted to above, some side mounting portions may be provided at an orientation other than perpendicular from other side mounting portions. For example, some mounting profiles may exhibit non-rectangular polygonal geometries, such that side mounting portions of the mounting profiles may extend relative to each other at a variety of different angles.

Generally, it may be useful for a mounting profile (and mounting portions thereof) to exhibit some degree of rotational symmetry, so that the associated module can be readily secured within a particular mounting aperture in a variety of rotational orientations. In some embodiments, mounting profiles with discrete rotational symmetry may be particularly useful, in order to provide a discrete number of potential installation orientations. As further discussed below, for example, the tetrad rotational symmetry of the mounting portions 36, 38, 40, 42 can allow the first and second optical modules 12, 14 to be secured at any of four discrete rotational orientations within the faceplate 16. In other embodiments, other types of rotational symmetry are also possible (e.g., for mounting profiles with a hexagonal or other polygonal shape, or other n-fold (CO rotationally symmetric profiles).

As stated above, the illustrated optical device for the first and second optical modules 12, 14 are first and second imaging sensors 32, 34. However, other optical devices such as, but not limited to, distance sensors, measurement systems or devices (e.g., time-of-flight, triangulation device, etc.), or optical aiming devices (e.g., for pattern projection) are also considered. In some embodiments, processor devices on a module (e.g., on the PCBs 28, 30) can be encoded with or otherwise configured to execute particular functionality, including relative to acquisition of images, targeting for image acquisition, distance measurements, and so on. In some embodiments, as also discussed below, an optical module can be configured for electronic communication with another device for execution of these or other functions. For example, the housing 18 includes a compartment 80 that houses a computing device 88 that can be programmed for execution of any variety of machine-vision (or other) functionality.

To facilitate communication with non-module computing devices, a variety of electronic connectors for modules can be provided. For example, a flexible PCB connector 82 can be selectively electronically connected to each of the first and second optical modules 12, 14, for transmission of data to or from the computing device 88 in the housing 18. In some embodiments, a flexible PCB connector can include a set of flexible PCBs that can couple one or more rigid PCBs together (for example rigid PCB 90 shown in FIG. 3). In some embodiments, a combination of rigid and flexible PCB connectors can be coupled together to provide flexibility and structure. In some embodiments, the flexible PCB connector 82 can include a hybrid rigid-flex PCB. Generally, a rigid-flex PCB has both rigid and flexible substrates that are laminated together into a single structure. Another form of PCB that can be used is a rigidized flex construction PCB, in which flex circuits include stiffeners attached to provide support for the electronic components on the circuit board. In some embodiments, other communication channels, including for wireless communications, are also contemplated.

The machine vision system 10 can also include a memory medium (shown here as configured to be a removable SD card receivable within an SD card slot in the housing 18). The memory medium can be used for storing scanned or processed images, buffering data and communications, storing computer-implemented instructions, and the like. In some embodiments, an optical module as disclosed herein may include a removable or other memory medium, As also discussed above, a mounting aperture that corresponds to a set of optical modules can generally include a mounting profile with mounting portions (e.g., structural edges or surfaces) that allow easy and customizable mounting of particular modules. Looking at FIGS. 2 and 3, for example, the faceplate 16 has a set of mounting apertures including a first mounting aperture 44 and a second mounting aperture 46. The first mounting aperture 44 has a first aperture side mounting portion 48 and a second aperture side mounting portion 52, and the second mounting aperture 46 has a first aperture side mounting portion 50 and a second aperture side mounting portion 54. The first aperture side mounting portions 48, 50 and the second aperture side mounting portion 52, 54 are configured to support and bound either one of the first or second optical modules 12, 14. As such, the first and second mounting apertures 44, 46 are both squared apertures, with the first aperture side mounting portions 48, 50 and the second aperture side mounting portions 52, 54 defining a portion of a square. Similar to different embodiments of the first and second optical modules 12, 14, the portion of the square formed by the first aperture side mounting portions 48, 50 and the second aperture side mounting portions 52, 54 can include right-angle corners or rounded corners, or other squared geometries.

Similarly, it is also contemplated that the first aperture side mounting portions 48, 50 can be provided at an orientation other than perpendicular from the second aperture side mounting portion 52, 54, and that the first and second mounting apertures 44, 46 can have a rotational symmetry relative to at least a part of the first aperture side mounting portions 48, 50 and the second aperture side mounting portions 52, 54. It is further contemplated, that the first aperture side mounting portions 48, 50 or the second aperture side mounting portions 52, 54 may extend along the entirety of, or a portion of, the respective side of the first and second mounting apertures 44, 46.

In some embodiments, a mounting profile of a mounting aperture can be configured to receive an optical module with a mounting profile (or other portions) of the optical module recessed within the mounting aperture. In this regard, for example, the first and second mounting apertures 44, 46 include squared mounting shoulders 70, 72 that are configured to receive and support the mounting profiles of the first and second optical modules 12, 14 to maintain the first and second optical modules 12, 14 at a particular translational and rotational orientation relative to the faceplate 16.

In the illustrated embodiment, the shoulders 70, 72 extend fully around the first and second mounting apertures 44, 46, although other configurations may exhibit recessed (or other) shoulders that extend along fewer (e.g., at least one) sides of a mounting aperture. Fastener supports 74, 76 are also be provided, within or extending from the mounting shoulders 70, 72, and are configured to receive fasteners 78 to securely fasten the first and second optical modules 12, 14 with the first and second mounting apertures 44, 46. In other embodiments, however, other fastener arrangements are possible including otherwise located fasteners or fastener supports, integrated movable fasteners (e.g., rotatable tabs), different numbers of fasteners, and so on.

In some embodiments, fasteners can have a shaft portion provided between the fastener head and the threaded portion of the fastener. The shaft portion can have a diameter sized approximately similar to the diameter of the hole in the fastener supports 74, 76. As a result of the similarly sized diameters, the shaft portions of the fasteners can engage the corresponding portions of the holes in the fastener supports 74, 76 to accurately align the optical modules 12, 14 within the mounting apertures 44, 46 with a precision fit relationship. Other similarly configured arrangements can also provide precision fit engagement at the optical modules 12, 14, as appropriate.

In some embodiments, access features can be provided in order to facilitate easier installation or removal of particular optical modules. This may be particularly useful, for example, in configurations in which part or all of a module is mounted in a recessed configuration. Some access features can be configured as indented access points, such as may receive a user's fingers or a tool to help remove an optical module from a mounting aperture. As illustrated in FIG. 1, for example, recesses 44a, 44b are provided as lateral extensions of the mounting aperture 44 and recesses 46a, 46b are provided as lateral extensions of the mounting aperture 46. The recesses 44a, 44b, 46a, 46b can allow a user to grip or otherwise engage the sides of the optical modules 12, 14 while the modules 12, 14 are recessed into the faceplate 16, and thereby allow relatively easy removal of the optical modules 12, 14 (once the fasteners 78 have been released). In some embodiments, providing recesses or other access features that extend in the same direction from different mounting apertures can provide more useful clearance for users to engage modules, as appropriate, although other configurations are possible.

In different embodiments, different mounting apertures can be arranged differently relative to each other within a particular faceplate. This may be useful, for example, in order to allow particular optical modules to be aligned with each other and with other machine vision equipment for optimal execution of particular operations. In the illustrated embodiment, the first and second mounting apertures 44, 46, continuing to look at FIG. 3, the first and second mounting apertures 44, 46 are linearly aligned with each other in a direction defined by the first aperture side mounting portions 48, 50, with the first-side mounting portions 48, 50 arranged collinearly on the faceplate 16. Further, the first and second mounting apertures 44, 46 are also aligned along a centerline 86 of the faceplate 16 (see FIG. 4), with a center 64 of the first mounting aperture 44 and a center 68 of the second mounting aperture 46 placed along the centerline 86.

In other configurations, however, other orientations are possible. For example, some sets of mounting apertures can exhibit mounting portions that are not linearly aligned with each other or side mounting portions that are angled relative to each other at oblique angles. Similarly, some sets of mounting apertures may not be aligned (or may not be centered) along a centerline of a faceplate or other similar reference feature. And, although the first and second mounting apertures 44, 46 are substantially identical, so as to interchangeably receive either of the first and second optical modules 12, 14 in a variety of different orientations, some arrangements may include non-identical mounting apertures, such as may be configured to interchangeably receive different optical modules or as may be configured to receive the same optical modules but only in a select subset of otherwise possible orientations.

Figure 4:
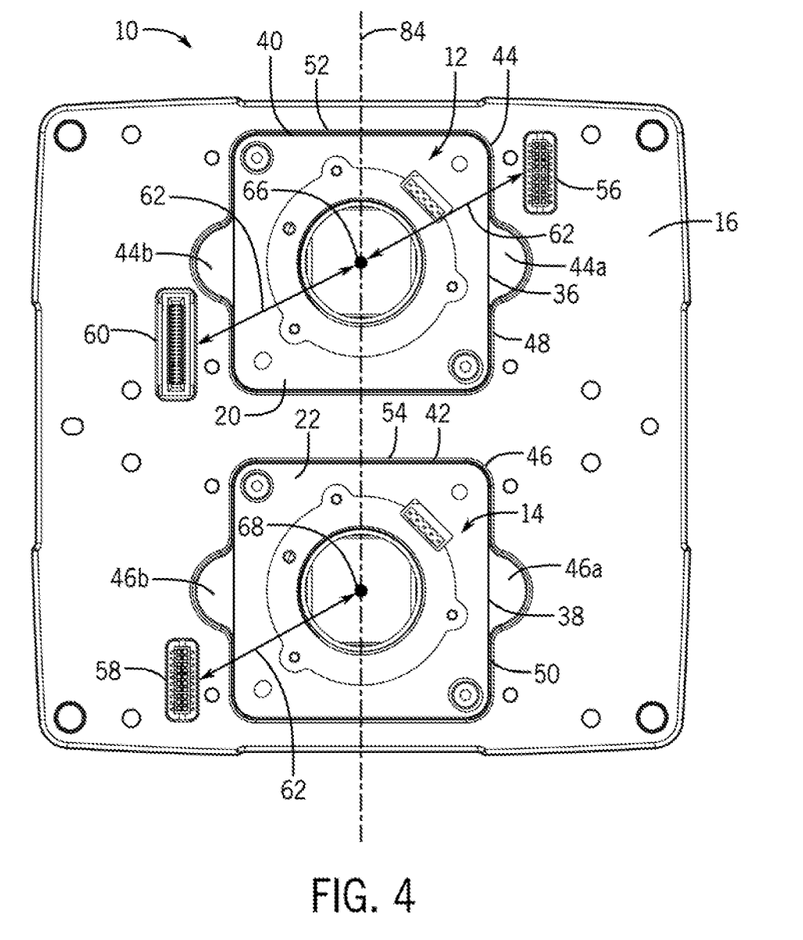
FIG. 4 is a front elevation view of the machine vision system of FIG. 1.
Figure 5:
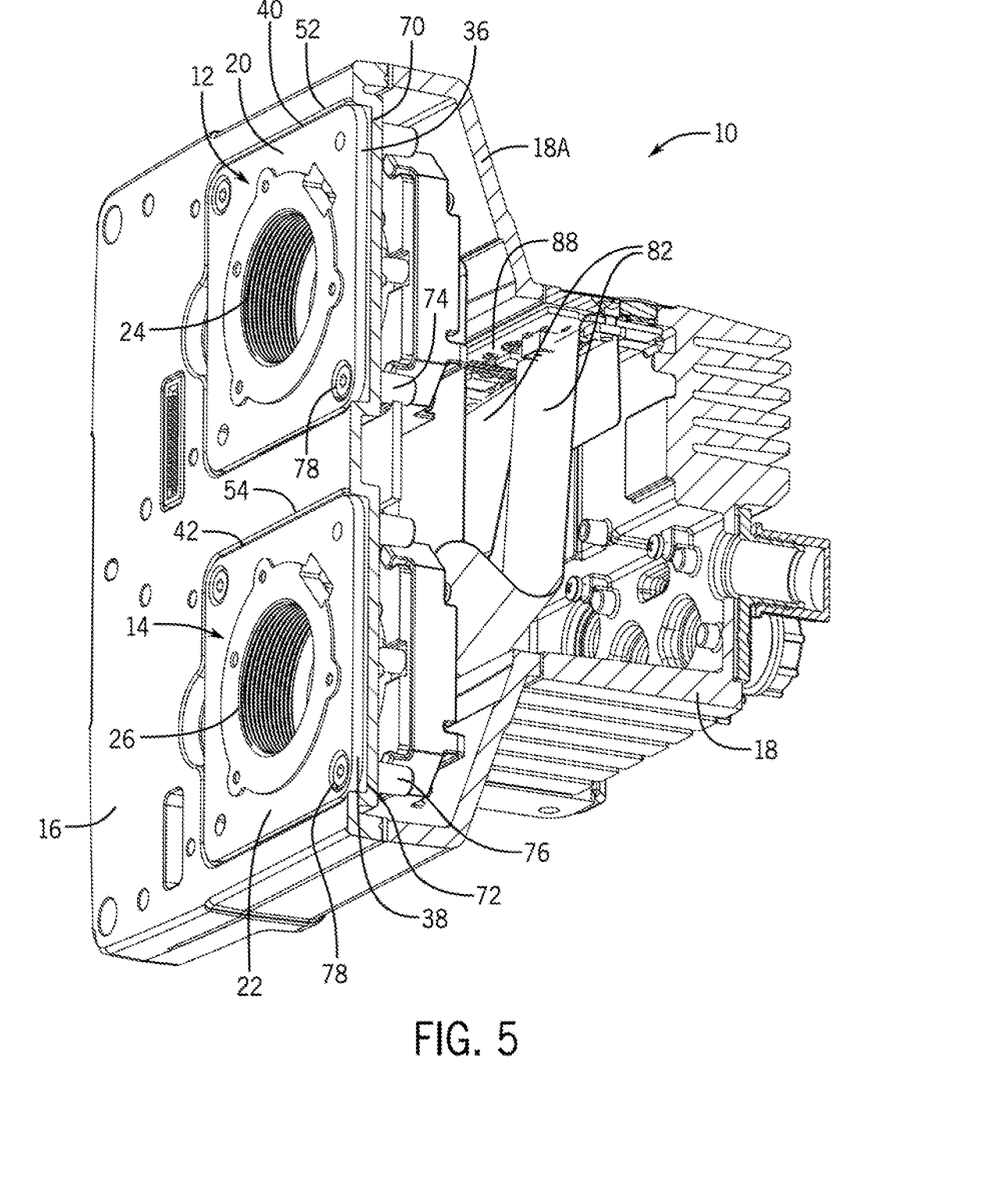
FIG. 5 is an isometric sectional view of the machine vision system along line 5-5 of FIG. 1.

In some embodiments, as also discussed above, communication channels can be provided for communication between modules and a large system to which the modules are attached. Referring to FIG. 4, for example, the faceplate 16 also includes a set of I/O ports including a first I/O port 56, a second I/O port 58, and a third I/O port 60. The I/O ports 56, 58, 60 are electrically connected to the computing device 88 in the housing 18 and can be configured to accept electrical connections for powering or controlling accessories such as, but not limited to, structured lights, adjustable lenses, or steerable mirrors. In some embodiments, a standardized configuration for an I/O port relative to a mounting aperture may further contribute to ready interchangeability of particular modules. For example, the I/O ports 56, 58 are of the same type and are provided at a common distance 62 from the respective centers 66, 68 of the first and second mounting apertures 44, 46. Similarly, although the I/O ports 56, 60 are of different types, they are both provided at the common distance 62 from the center 66 of the first mounting aperture 44. Thus, for example, electrical connectors of different types for different modules can be readily connected to a relevant I/O port, regardless of which mounting aperture 44, 46 receives a particular module.

In some embodiments, other configurations are possible. For example, some embodiments can include other arrangements of I/O ports, such as arrangements that include multiple ports similar to the I/O ports 56, 58, but distributed at multiple locations around each of the relevant mounting apertures.

With the illustrated arrangement, and other similar arrangements according to the disclosed technology, optical modules can be interchangeable mounted at different locations and at different locations on a faceplate in order to accommodate a wide range of machine-vision operations. Looking back at FIG. 1, for example, the faceplate 16 is shown in a first orientation, the first optical module 12 is shown in a first orientation within the first mounting aperture 44 and the second optical module 14 is shown in a first orientation within the second mounting aperture 46. The first-side mounting portion 36 of the first optical module 12 is engaged with the first aperture side mounting portion 48 of the first mounting aperture 44 and the second-side mounting portion 40 is engaged with the second aperture side mounting portion 52. Further, the first-side mounting portion 38 of the second optical module 14 is shown engaged with the first aperture side mounting portion 50 of the second mounting aperture 46 and the second-side mounting portion 42 is engaged with the second aperture side mounting portion 52.

Figure 6:
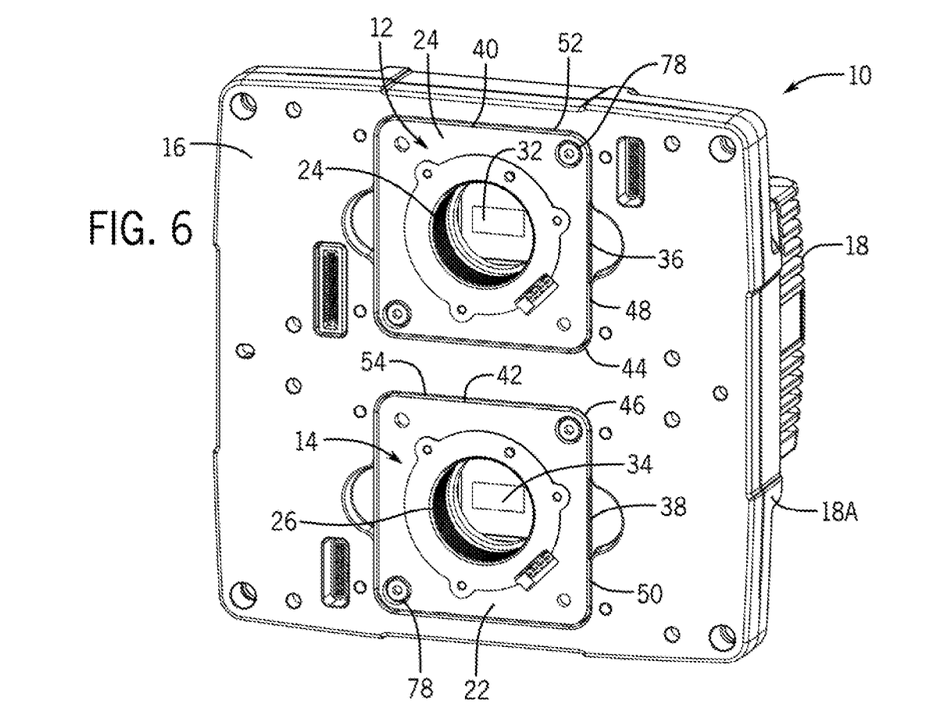
FIG. 6 is an isometric view of the machine vision system of FIG. 1 with the set of modules in another orientation.
Figure 7:
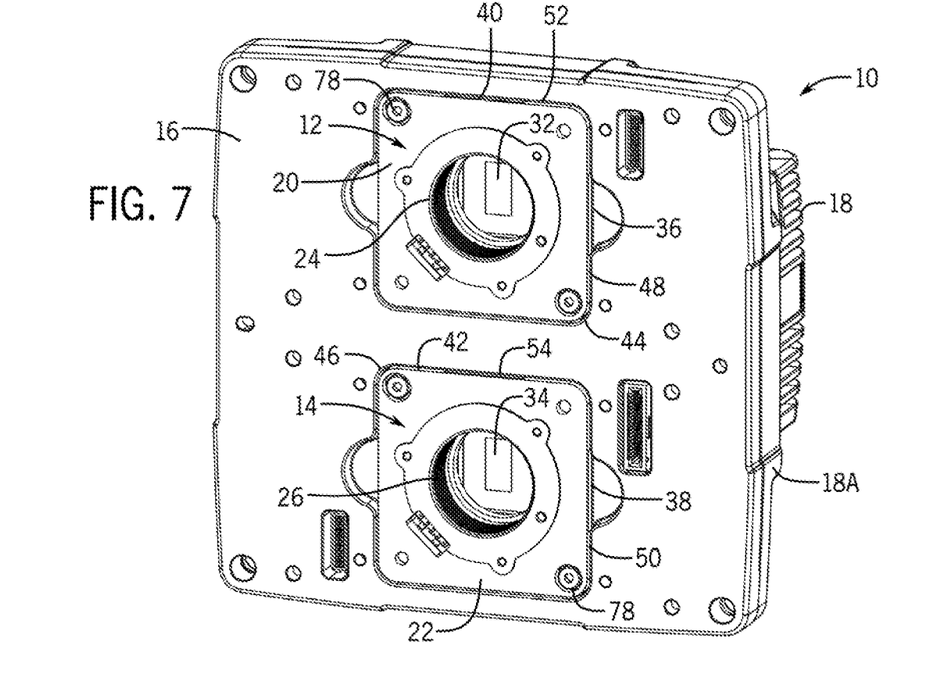
FIG. 7 is an isometric view of the machine vision system of FIG. 1 with the set of modules in another orientation.

The configuration illustrated in FIG. 1 may be particularly useful for a particular set of machine vision operations or operational contexts. Further, because of the rotational symmetry of the mounting portions of the first and second optical modules 12, 14 and of the first and second mounting apertures 44, 46, each of the first and second optical modules 12, 14 can be alternatively secure in either one of the apertures 44, 46. And because of the common mounting geometries of the optical modules 12, 14 and the mounting apertures 44, 46, the optical modules 12, 14 can be secured in either of the mounting apertures 44, 46 at a discrete plurality of different rotational orientations. For example, as shown in FIG. 6, the first and second optical modules 12, 14 are shown in a second orientation with a rotational difference of 90 degrees clockwise (i.e., rotated 90 degrees clockwise) from the first orientation. As another example, as shown in FIG. 7, the first and second optical modules 12, 14 are shown in a third orientation with a rotational difference of 90 degrees clockwise from the second orientation in FIG. 6. Although not shown, it should be understood that the first and second optical modules 12, 14 can be provided in a fourth orientation with a rotational difference of 90 degrees counter-clockwise from the first orientation shown in FIG. 1.

Aside from provide a discrete set of rotational orientations, certain configurations of mounting portions of optical modules and mounting apertures can also help to secure the modules against rotation relative to mounting apertures. For example, engagement of the squared (and linear) mounting portions 36, 38, 40, 42 of the first and second optical modules 12, 14 with the squared (and linear) mounting portions 46, 48, 50, 52 of the first and second mounting apertures 44, 46 can relatively firmly secure the first and second optical modules 12, 14 against rotation relative to the faceplate 16, as may allow for relatively precise calibration and operation of related optical systems (e.g., dimensioners, imaging devices, and so on).

The first and second optical modules 12, 14 are receivable within either the first or second mounting apertures 44, 46, but only one at a time. Further, the orientations and locations of the first and second optical modules 12, 14 as expressly discussed above are provided as examples only. For example, the first optical module 12 can be provided in the first orientation in the second mounting aperture 46 with the second optical module 14 provided in the second orientation in the first mounting aperture 44, and so on.

It can be advantageous in some embodiments to automatically monitor or otherwise manage the orientation and placement of the first and second optical modules 12, 14 within the first and second mounting apertures 44, 46. To that end, for example, a position indicator can be included in the machine vision system 10 to indicate a position (e.g., orientation or location) of the first and second optical modules 12, 14 when received within a mounting aperture. Some position indicators can operate by mechanical contact to locate (e.g., hold or provide tactile feedback to) the first and second mounting bodies for installation. For example, a detent and receptacle (e.g., divot) or interlocking teeth on a mounting body and around a mounting aperture can indicate one or more rotational alignments for a particular optical module.

Some embodiments can indicate by electrical signal an installed orientation of the respective mounting body. For example, a pin can extend from a portion of both the first and second optical modules 12, 14 to extend into a receptacle in the mounting shoulders 70, 72 of the first and second mounting apertures 44, 46. An electrical circuit activated by the pin in a particular receptacle can then indicate a particular orientation. In some cases, such an electrical circuit can be configured to determine which of the first and second optical modules 12, 14 is currently attached at a particular mounting aperture. In another form of a location sensor, a first (e.g., fixed) magnet can be selectively placed on or within the first and second optical modules 12, 14 so as to interact with a second (e.g., fixed) magnet selectively placed on the mounting shoulders 70, 72 or at a location within the faceplate 16 when the first and second magnets are within a certain proximity (e.g., a magnetically operated mechanical or electrical switch).

Figure 8:
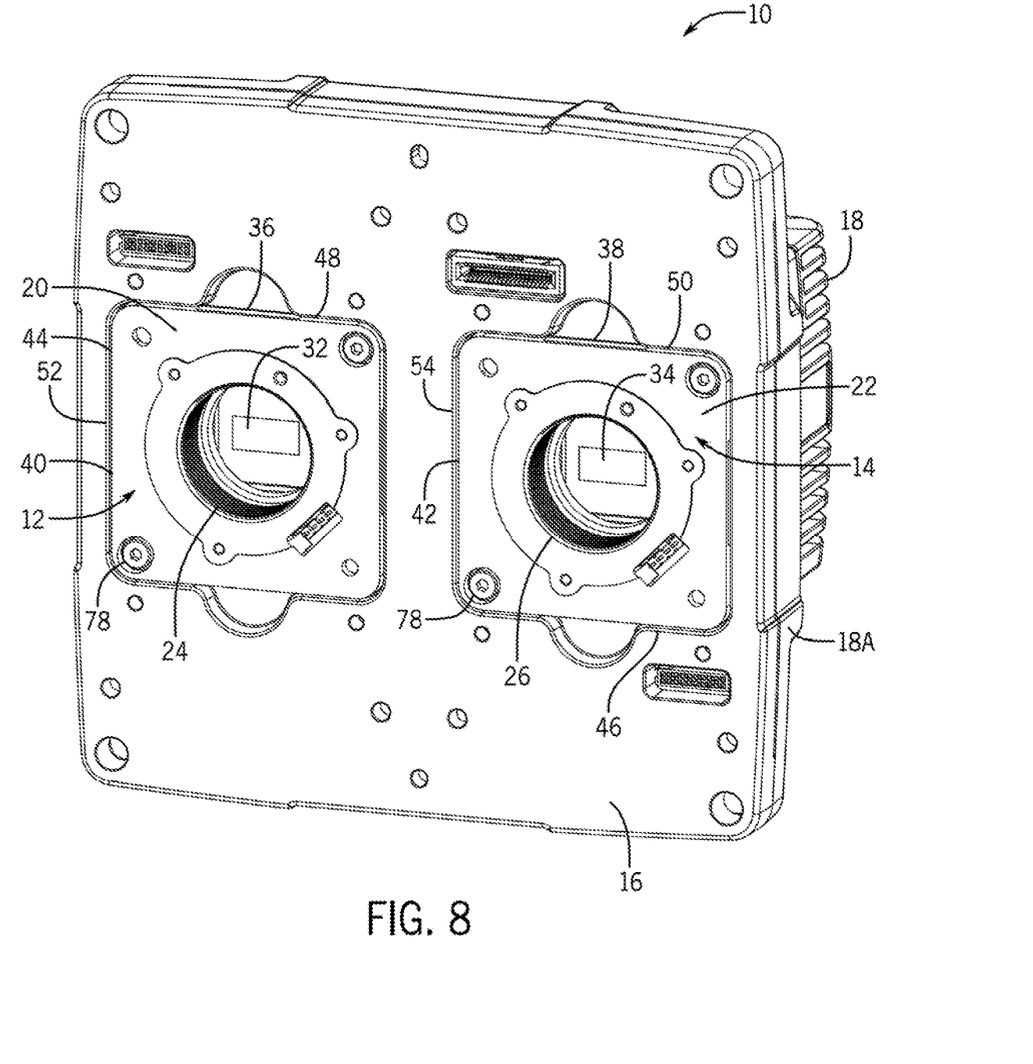
FIG. 8 is an isometric view of the machine vision system of FIG. 1 with the faceplate in another orientation.

Looking at FIGS. 6-8 the machine vision system 10 can provide a dual sensor system that includes both the first and second imaging sensors 32, 34 of the first and second optical modules 12, 14. In some embodiments, an imaging sensor can be shaped as elongated rectangle such as can have horizontal/vertical pixel rations of 5:4, 4:3, or 16:9. Correspondingly, in some dual sensor system applications either of the imaging sensors 32, 34 can be aligned in a horizontal direction (FIG. 6), and in other applications either of the imaging sensors can be aligned vertically 32, 34 (FIG. 7). In different embodiments, due to the rotational adaptability of the modules 12, 14, the long axes of the image sensors 32, 34 can be aligned in parallel and non-collinear (FIG. 6), in parallel and co-linear (FIG. 7), perpendicular to each other (e.g., combining the orientation of the sensor 32 in FIG. 6 and the orientation of the sensor 34 in FIG. 7), or otherwise.

In some embodiments, as also noted above, a faceplate can be removable and rotationally adjustable relative to a larger system. For example, FIG. 8 illustrates that the faceplate 16 can be positioned in a second orientation relative to the housing 18, as compared to the orientation of FIG. 1. The second orientation of the faceplate 16 has a rotational difference of 90 degrees counter-clockwise (i.e., the faceplate 16 is rotated 90 degrees (counter-clockwise)) from the first orientation of the faceplate 16 in FIG. 7. The ability to rotate the orientation of the faceplate 16 relative to the housing 18 allows the first and second optical modules 12, 14 to be aligned horizontally (e.g., parallel to a housing axis 84 (FIG. 3)) or vertically (e.g., perpendicular to the housing axis 84; FIGS. 1, 6, and 7), as may facilitate certain types of machine vision operations, including for modules other than the optical modules 12, 14. It should be understood that the faceplate 16 can also be arranged in a third orientation by rotating the faceplate 16 an additional 90 degrees (counter-clockwise) and a fourth orientation by rotating the faceplate 16 90 degrees (clockwise) from the first orientation in FIG. 7. Further, other embodiments may exhibit other types of adjustability for a faceplate or other mounting structure for optical modules.

Figure 9:
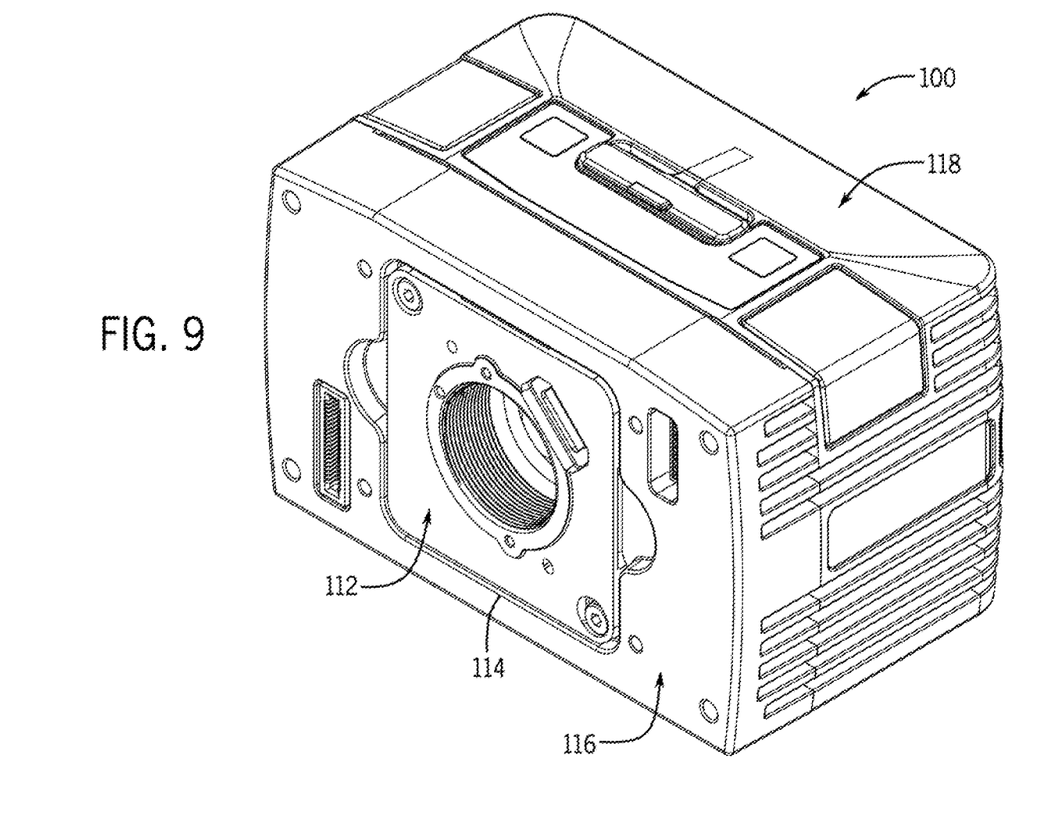
FIG. 9 is an isometric view of a machine vision system with a faceplate and an interchangeable optical module in accordance with some embodiments of the technology.

Although the ability to customizably use two modules at once may be useful in many contexts, some embodiments may exhibit a different number of modules and mounting apertures. For example, FIG. 9 illustrates another embodiment of a machine vision system 100 configured for use with only a single optical module at a time. In many aspects, the machine vision system 100 is similar to the machine vision system 10 described above and similar numbering in the 100 series is used for the machine vision system 100. For example, the machine vision system 100 has a faceplate 116 coupled to a housing 118 and an optical module 112 mounted within a mounting aperture 144 within the faceplate 116. The optical module 112 is generally similar to the optical modules 12 and can be mounted within the aperture 144 in similar configurations to that described above with respect to the first and second optical modules 12, 14 within the first and second apertures 44, 46 of the faceplate 16. In some aspects, however, the machine vision systems 10, 100 differ from each other. For example, the faceplate 116 has only the one mounting aperture 144, in which the optical module 112 is mounted. Thus the machine vision system 10 can generally be used only with one optical module at a time, although other modules can be swapped with the optical module 112 to provide a wide range of functionality.

Figure 10:
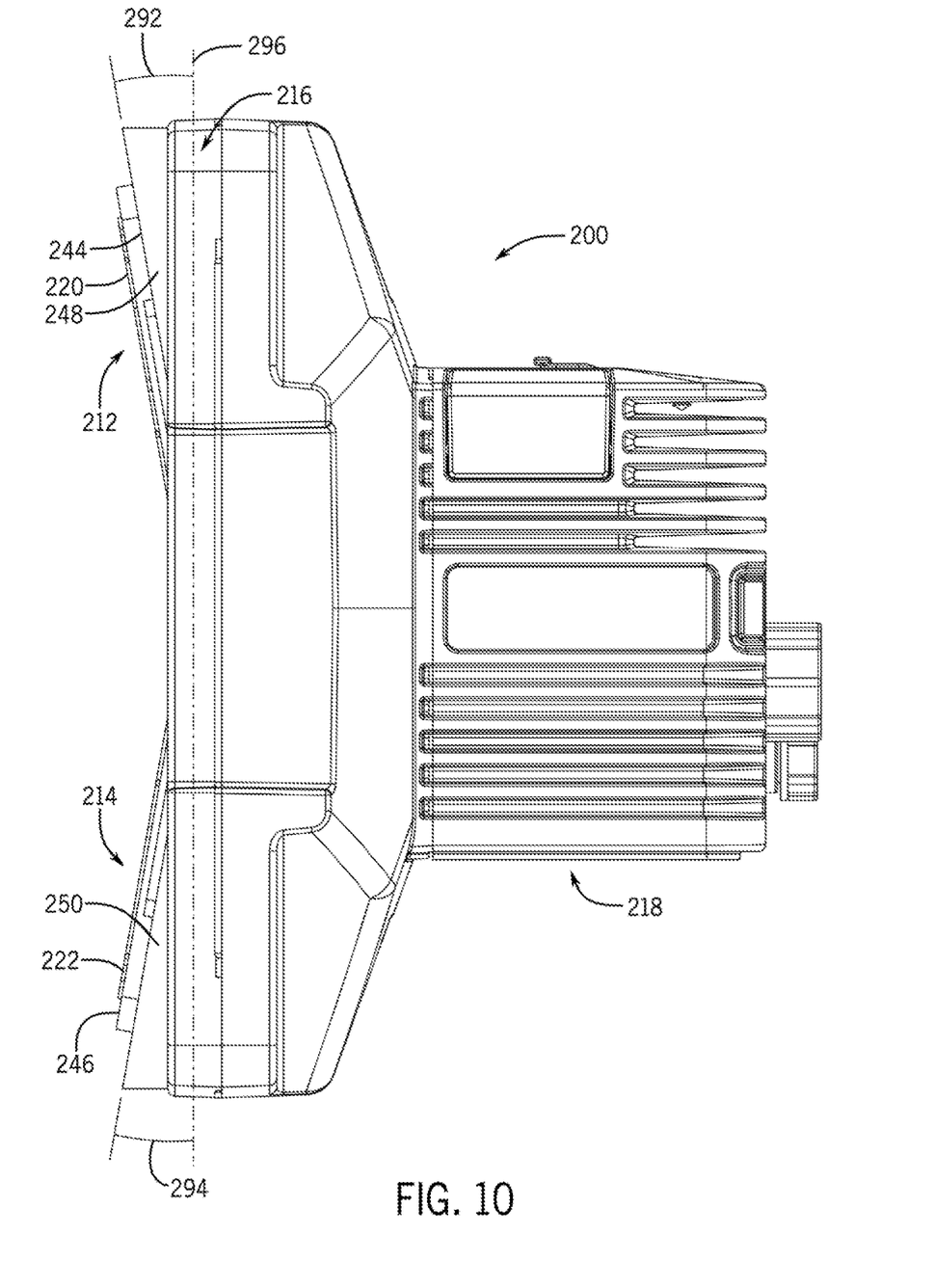
FIG. 10 is a right side elevation view of a machine vision system with a faceplate and a set of angled interchangeable optical modules in accordance with some embodiments of the technology.

FIG. 10 illustrates another embodiment of a machine vision system 200. In many aspects, the machine vision system 200 is similar to the machine vision systems 10, 100 described above and similar numbering in the 200 series is used for the machine vision system 200. For example, the machine vision system 200 has a faceplate 216 coupled to a housing 218. The machine vision system 200 also has a first optical module 212 and a second optical module 214 mounted to the faceplate 216. The first and second optical modules 212, 214 can generally be mounted within the faceplate 216 in similarly customizable configurations to those described above with respect to the first and second optical modules 12, 14 within the first and second apertures 44, 46 of the faceplate 16.

In some aspects, however, the machine vision system 200 differs from the machine vision systems 10, 100. For example, rather than sitting flushly against a flat front surface of the faceplate 116, the first and second optical modules 212, 214 are positioned to angle forward of the faceplate 116 at an angle 292, 294, relative to a plane 296 along which the faceplate 216 lies. Thus, optical devices (not shown) on the modules 212, 214 can be used in operations, such as triangulation or 3D imaging, that require non-parallel optical axes or other similar configurations.

In different embodiments, non-planar mounting for optical modules can be provided in different ways. For example, the angles 292, 294 can be provided by angled mounting portions (e.g., first aperture side mounting portions 248, 250 in FIG. 10) of the first and second apertures 244, 246 of the faceplate 216 as shown. Additionally, or alternatively, the angles 292, 294 can be provided by the form of the first and second mounting bodies 220, 222 of the first and second optical modules 212, 214.

In some embodiments, the angles 292, 294 can be the same or similar. In other embodiments, as shown in FIG. 10, the angles 292, 294 can be dissimilar. In some embodiments, the angles 292, 294 of the first and second optical modules 212, 214 can be adjustable relative to the plane 296, including through adjustment of mounting structures in the relevant mounting apertures, or through adjustment or selection of different optical modules. In some embodiments, the first and second optical modules 212, 214 can be angled away from each other rather than toward each other as shown in FIG. 10, or can angle in the same direction. In some embodiments, the angles 292, 294 of each of the first and second optical modules 212, 214 can be derived from different axes of rotation (e.g., so that the modules 212, 214 are angled in opposite lateral directions). In some embodiments, one of the angles 292, 294 of the first or second modules 212, 214 can be zero (i.e., the module can be non-angled).

Referring again to FIG. 1, for example, in some embodiments of the technology a method of installing a set of optical modules in a machine vision device is provided. In one embodiment, the first optical module 12 is positioned in a predetermined orientation relative to the housing axis 84 and is received within one of the first or second mounting apertures 44, 46 in the faceplate 16. The second optical module 14 is positioned in a predetermined orientation relative to the housing axis 84 and is received within the other of the first or second mounting apertures 44, 46. The first and second optical modules 12, 14 can also be secured to the faceplate 16. An electrical connection can be made between at least one of the first optical module 12 or the second optical module 14 to the computing device 88 of the machine vision system 10 for electrical communication therebetween. In some embodiments, the faceplate 16 is positioned in a predetermined orientation relative to the housing axis 84 and is secured thereto. An electrical connection can be made between the faceplate 16 and the computing device 88 of the machine vision system 10 for electrical communication therebetween.

The particular embodiments disclosed above are illustrative only, as the technology may be modified and practiced in different but equivalent manners apparent to those skilled in the art having the benefit of the teachings herein. Further, no limitations are intended to the details of construction or design herein shown, other than as described in the claims below. It is therefore evident that the particular embodiments disclosed above may be altered or modified and all such variations are considered within the scope and spirit of the technology. Accordingly, the protection sought herein is as set forth in the claims below.

What is claimed is:

1. A modular sensor system comprising:
a housing;
a faceplate removably mountable to the housing, the faceplate having a first squared mounting aperture and a second squared mounting aperture;
a first squared modular mounting body supporting a first optical device; and
a second squared modular mounting body supporting a second optical device;
each of the first and second mounting bodies being separately removably securable within either of the first or second mounting apertures in either of a first orientation or a second orientation.

2. The modular sensor system of claim 1, wherein each of the first and second mounting bodies includes a square front flange that is configured to seat on a recessed shoulder of the first or second mounting apertures of the faceplate.

3. The modular sensor system of claim 1, wherein the faceplate is securable to the housing in either of a first rotational orientation or a second rotational orientation.

4. The modular sensor system of claim 3, wherein a squared mounting portion of each of the first or second mounting apertures is aligned perpendicularly relative to an imaging axis of the housing when the faceplate is in the first rotational orientation and is aligned parallel relative to the imaging axis of the housing when the faceplate is in the second rotational orientation.

5. The modular sensor system of claim 1, wherein the first optical device includes a first imaging sensor with an elongated rectangular shape and the second optical device includes a second imaging sensor with an elongated rectangular shape;
wherein the long dimensions of the first and second imaging sensors are oriented parallel to each other when the first and second squared modular mounting bodies are both installed in the respective first orientation; and
wherein the long dimensions of the first and second imaging sensors are oriented perpendicular to each other when the first squared modular mounting body is installed in the first orientation and the second squared modular mounting body is installed in the second orientation.

6. The modular sensor system of claim 1, wherein the first optical device has a first lens mount configured to receive a first lens of a first mounting type and the second optical device has a second lens mount configured to receive a second lens of a second mounting type.

7. The modular system of claim 1, wherein the faceplate has a first I/O port adjacent the first mounting aperture and a second I/O port adjacent the second mounting aperture.

8. The modular system of claim 1, further comprising a position indicator configured to indicate an installed position of either of the first or second optical devices on the faceplate.

9. The modular system of claim 1, further comprising a machine vision computing device within the housing, the machine vision computing device in electrical communication with the first optical device and the second optical device over a flexible PCB connector.

10. A modular sensor system comprising:
a faceplate having a first mounting aperture and a second mounting aperture;
a first optical module including a first optical device secured to a first mounting body, the first mounting body being selectively securable within either the first or second mounting apertures in a first plurality of rotationally distinct orientations for operation of the first optical device; and
a second optical module including a second optical device secured to a second mounting body, the second mounting body being selectively securable within either the first or second mounting apertures in a second plurality of rotationally distinct orientations for operation of the second optical device.

11. The modular sensor system of claim 10, wherein each of the first mounting aperture, the second mounting aperture, the first mounting body, and the second mounting body includes a respective polygonal mounting portion.

12. The modular sensor system of claim 11, wherein each of the respective polygonal mounting portions includes a respective set of squared mounting portions, the squared mounting portions of each of the first and second mounting apertures being configured to engage the squared mounting portions of either of the first or the second optical modules with the first and second optical modules in either of at least two of the rotationally distinct orientations.

13. The modular sensor system of claim 10, wherein the faceplate is configured to mount to a housing of a machine vision device in either of a first orientation or a second orientation.

14. The modular sensor system of claim 13, wherein a rotational difference between the first orientation of the faceplate and the second orientation of the faceplate is 90 degrees.

15. The modular sensor system of claim 10, wherein the first optical module is configured to removably receive and electrically communicate with a lens.

16. A modular sensor system for a machine vision system that includes a faceplate with a first mounting aperture and a second mounting aperture, the modular sensor system comprising:
a plurality of optical modules, each of the optical modules including a mounting body and at least one of an optical device or a lens mount;
wherein a first-side mounting portion and a second-side mounting portion of each of the mounting bodies are configured to engage either of a first-side mounting portion or a second-side mounting portion of either of the first or second mounting apertures to secure the respective mounting body to the faceplate and against rotation relative to the respective first or second mounting aperture with the respective mounting body in any of a plurality of mounting orientations.

17. The module sensor system of claim 16, wherein the mounting portions of each of the mounting bodies are configured to engage the mounting portions of each of the faceplate mounting apertures to selectively secure the respective mounting body against rotation with the respective mounting body at either of a first or a second rotational orientation.

18. The modular sensor system of claim 17, wherein a rotational difference between the first and second rotational orientations is 90 degrees.

19. The module sensor system of claim 16, wherein the first-side and second-side mounting portions of each of the optical modules includes squared rotationally-symmetric peripheral walls.

20. The modular sensor system of claim 16, wherein the first-side and second-side mounting structures of each of the mounting bodies collectively define a rectangular mounting structure.

* * * * *